United States Patent
Lüers

(10) Patent No.: US 9,884,433 B2
(45) Date of Patent: Feb. 6, 2018

(54) METHOD AND DEVICE FOR HEATING AN END SECTION OF A PLASTIC PIPE

(71) Applicant: Lüers Maschinen- und Stahlbau GmbH, Lutten-Goldenstedt (DE)

(72) Inventor: Gregor Lüers, Lutten (DE)

(73) Assignee: Lüers Maschinen- und Stahlbau GmbH, Lutten-Goldenstedt (DE)

( * ) Notice: Subject to any disclaimer, the term of this patent is extended or adjusted under 35 U.S.C. 154(b) by 579 days.

(21) Appl. No.: 14/373,006

(22) PCT Filed: Jan. 28, 2013

(86) PCT No.: PCT/EP2013/051600
§ 371 (c)(1),
(2) Date: Jul. 17, 2014

(87) PCT Pub. No.: WO2013/113662
PCT Pub. Date: Aug. 8, 2013

(65) Prior Publication Data
US 2014/0349238 A1 Nov. 27, 2014

(30) Foreign Application Priority Data

Feb. 1, 2012 (EP) .................................... 12153486

(51) Int. Cl.
*B29B 13/02* (2006.01)
*B29K 101/12* (2006.01)
(Continued)

(52) U.S. Cl.
CPC ............ *B29B 13/02* (2013.01); *B29B 13/025* (2013.01); *B29K 2101/12* (2013.01); *B29K 2105/258* (2013.01); *B29L 2023/22* (2013.01)

(58) Field of Classification Search
CPC ............................. B29L 313/02; B29L 2023/22
(Continued)

(56) References Cited

U.S. PATENT DOCUMENTS 3,484,321 A * 12/1969 Oswald ................. B29B 13/024
156/499
3,728,059 A * 4/1973 de Putter .............. B29C 57/045
264/312
(Continued)

FOREIGN PATENT DOCUMENTS

DE 2536306 2/1977
DE 3045374 7/1982
EP 1315604 10/2011

*Primary Examiner* — Gregory A Wilson
(74) *Attorney, Agent, or Firm* — Thomas M. Freiburger

(57) ABSTRACT

The invention relates to a method and a device for heating an end section of a plastic pipe (1) to prepare for the formation of a sleeve on the plastic pipe, such that the end section can be heated to the deformation temperature of the plastic pipe or even higher by heating on the exterior by means of external heating jaws (2, 3) and on the interior by means of a heating mandrel (4) that can be inserted from the end into the plastic pipe (1). According to the invention, the end section is heated by means of a heating mandrel (4) with at least one first length section (6) and one second length section (5), such that the diameter along the first forward length section (6) is smaller than the internal diameter of the end section of the pipe, and the diameter of the heating mandrel (4) is increased over the second length section (5), which follows the first length section (6) toward the end of the heating mandrel (4), such that the end of the second length section (5) comes in contact with the interior of the end section of the pipe on heating the end section of the pipe, so that the end of the end section of the pipe to be heated is in contact with both the external heating jaws (2, 3) and the heating mandrel (4) when the pipe is heated.

4 Claims, 3 Drawing Sheets

(51) Int. Cl.
*B29K 105/00* (2006.01)
*B29L 23/00* (2006.01)

(58) Field of Classification Search
USPC .... 432/1, 224, 225; 264/239, 299, 319, 320, 264/323, 296, 322
See application file for complete search history.

(56) References Cited

U.S. PATENT DOCUMENTS

| | | | | |
|---|---|---|---|---|
| 3,761,550 A * | 9/1973 | Seefluth | B29B 13/024 | 219/411 |
| 3,899,565 A * | 8/1975 | de Putter | B29C 57/00 | 264/294 |
| 3,991,150 A * | 11/1976 | De Putter | B29C 57/045 | 264/310 |
| 4,107,249 A * | 8/1978 | Murai | B29C 57/04 | 264/296 |
| 4,150,087 A * | 4/1979 | de Putter | B29C 57/02 | 264/296 |
| 4,157,372 A * | 6/1979 | Kyomen | B29C 57/04 | 264/296 |
| 4,207,283 A * | 6/1980 | French | B29C 57/00 | 264/322 |
| 4,217,096 A * | 8/1980 | Hayes | B29B 13/025 | 432/197 |
| 4,352,659 A * | 10/1982 | Salmela | B29B 13/025 | 219/400 |
| 4,406,852 A * | 9/1983 | Riegel | B29C 57/02 | 264/296 |
| 4,430,052 A * | 2/1984 | Olsson | B29C 57/04 | 425/392 |
| 5,057,263 A * | 10/1991 | Bengtsson | F16L 47/10 | 264/249 |
| 5,145,629 A * | 9/1992 | Nilsson | B29B 13/024 | 264/292 |
| 5,948,332 A * | 9/1999 | Prenger | B29C 47/0023 | 264/209.5 |
| 6,596,121 B1 * | 7/2003 | Reynolds, Jr. | B29C 33/505 | 138/97 |
| 2010/0264564 A1 * | 10/2010 | Tabanelli | B29C 57/02 | 264/323 |

* cited by examiner

METHOD AND DEVICE FOR HEATING AN END SECTION OF A PLASTIC PIPE

BACKGROUND OF THE INVENTION

The invention relates to a method for heating an end section of a plastic pipe according to the preamble of claim 1 as well as a device for performing the corresponding method.

Plastic pipes produced by a continuous method are usually divided into certain lengths for storage, shipping and use. In sewer technology in particular, a number of different pipe lengths are assembled in a suitable manner to form pipelines at the construction site. One end of a pipe is provided with a sleeve into which the spigot end of another pipe can be inserted.

To produce a sleeve on a pipe, the corresponding end of the pipe is usually heated first to the deformation temperature and then the sleeve is shaped using a molding tool.

For heating the end section of a plastic pipe to the deformation temperature, it is known that the end section can be contacted by means of external heating jaws and the interior of the end section can be heated by a heating mandrel in a noncontact process. To compensate for manufacturing tolerances, a gap is usually provided between the heating mandrel and the interior wall of the pipe. Heat is transferred by means of radiant heat here. It is also known that the interior of the pipe can be heated by hot air.

It is known from DE 25 36 306 B2 that the end sections of a pipe can be heated by means of an infrared lamp, which is cooled by a stream of air during this heating. A similar design can also be found in EP 1 315 604 B1, in which several radiant heating elements are arranged eccentrically on a carrier that can be driven to rotate about the axis of the pipe, while gas jets assigned to them cool the interior of the plastic pipe at the site of the greatest thermal radiation. This cooling is necessary because high-energy input into the interior of the pipe is necessary to shorten the heating time, on the one hand, but, on the other hand, radiant heating without cooling the interior of the pipe would result in excessive surface temperatures. Instead of a radiant heating element, contact heating elements, which are designed as spreading mandrels, are also known but they are complex to manufacture and operate.

Another problem in heating plastic pipes is that there is a certain shrinkage of the diameter at the cut edge of a pipe, in particular when it is made of high-shrinkage plastics, such as polypropylene, polyethylene or PVC. When the end section of a pipe is heated by means of external heating jaws in contact with the pipe, there is no direct contact there because of the shrinkage of the end region of the pipe, so that adequate heating is not achieved on the exterior in the end region of the pipe. As a result, the dimensional stability may be impaired in subsequent production of the sleeve at the end of the pipe. At a construction site, when connecting the spigot end of one pipe with a maximum diameter by inserting it into a sleeve, it is often necessary to discard such pipes as not fitting.

Storage at an elevated temperature may also result in shrinkage in the end region of the pipe before beading and may make the pipe difficult to connect.

The object of the present invention is therefore to provide a method for heating an end section of a plastic pipe to prepare for the formation of a sleeve such that complete heating of the end section of the pipe up to the cut edge is possible. In addition, the invention is based on the object of providing a device for carrying out a corresponding method.

SUMMARY OF THE INVENTION

This object is achieved by the invention defined in claims 1 and 5. Refinements of the invention are defined in the dependent claims.

With the subject matter of the invention, the end section of a plastic pipe is heated in preparation for forming a sleeve due to the fact that the end section is brought in contact with heating jaws on the exterior, and on the interior it is heated to a temperature at or above the deformation temperature of the plastic pipe by means of a heating mandrel that can be inserted into the plastic pipe from the end.

This method according to the invention uses a heating mandrel, whose diameter along a first forward length section is selected to be slightly smaller than the internal diameter of the end section of the pipe. However, the diameter of the heating mandrel over a second length section following the first length section is increased, so that the end of the second length section comes in contact with the interior of the pipe when the end section of the pipe is heated, so that the end of the end section of the pipe is in contact with both the external heating jaws and the heating mandrel when the end section is being heated.

Although the heating mandrel forms a small gap from the interior of the pipe over the first longitudinal section, the gap is reduced toward the end of the second length section in such a way that the rear end of the heating mandrel can come in contact with the interior of the pipe on insertion into the pipe and thus the pipe can become wider to the extent that it can also come in contact with the external heating jaws along its cut edge, so that the pipe may be heated as required up to the cut edge.

The heating mandrel is preferably designed as a cylindrical metal body having a first diameter, which is selected along a first forward length section, and a second length section at the end of the heating mandrel with a second diameter, such that the second diameter is larger than the first diameter. The second length section increases in a wedge shape from the first diameter to the second diameter at the end of the heating mandrel.

On insertion of such a heating mandrel into a plastic pipe, the wedge shape at the end displaces any possible shrinkage of the plastic pipe outward, so that the external end of the plastic pipe, which is in contact with the cut edge, can itself come in contact with the external heating jaws on the exterior, thus allowing adequate heating of the pipe to take place. The first length section preferably extends into the region of beading to be formed in the pipe during the formation of the sleeve, and the second length section corresponds approximately to the length between the cut edge and the formation of the beading that is to be provided.

The heating temperatures for polypropylene and polyethylene pipes are preferably 150°-160° C. for the external heating jaws and 140°-180° C. for the surface of the heating mandrel.

In the case of PVC pipes, the preferred temperatures for the external jaws are 130°-150° C. and for the heating mandrel 120°-160° C.

The wedge angle of the second longitudinal section is approx. 2°-20°, preferably 5°.

The second length section is preferably also connected to a third cylindrical length section, whose diameter corresponds to the diameter of the rear end of the second length section.

The cylindrical heating mandrel is made in particular of solid aluminum or an aluminum alloy and has a central borehole to receive a central heating element, which may be designed as an electric heating cartridge, for example. Instead of a central heating element, the heating mandrel may also contain boreholes arranged in a ring on the circumference, each of which is designed to receive a heating rod. The heating mandrel may have an annular design, so that its total mass is reduced.

DESCRIPTION OF THE DRAWINGS

The invention will now be explained in greater detail on the basis of one exemplary embodiment, in which.

DESCRIPTION OF PREFERRED EMBODIMENTS

Figure 1:
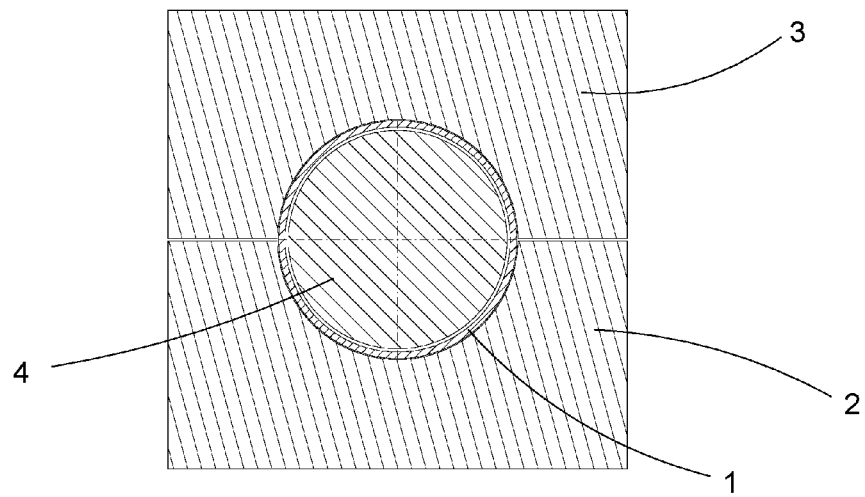
FIG. 1 shows a sectional view through a plastic pipe with the heating jaws attached and with the heating mandrel retracted.

The cross section illustrated in FIG. 1 shows a plastic pipe 1, which is situated in the gap between two external heating jaws 2, 3 and an internal heating mandrel 4. The heating mandrel 4 is shown as a cylindrical body, which may either contain a central heating rod or may have a plurality of smaller heating rods distributed in a ring around the circumference. In the latter case, the heating mandrel may also be designed in the form of a ring to reduce the total mass of the heating mandrel. The material of the heating mandrel is preferably aluminum or an aluminum alloy with a high thermal conductivity.

The external shell-type heating jaws 2, 3 are brought into contact with the exterior of the plastic pipe 1. When the heating jaws are closed, the pipe is secured in such a way that lateral displacement of the pipe on insertion of the heating mandrel is prevented, in particular when the rear inclination (second length section 5) widens the end of the pipe. The cylindrical heating mandrel 4 has a small distance of 0.5-2 mm from the interior of the plastic pipe to be able to equalize manufacturing tolerances in the plastic pipe, so that no clamping can occur in insertion of the heating mandrel into the plastic pipe and extraction therefrom.

The temperature of the external heating jaws is 150°-160° C. for propylene and polyethylene pipes, and the temperature of the heating mandrel is 140°-180° C.

When using the heating device for PVC pipes, the temperature of the external heating jaws is 130°-150° C. and the temperature of the heating mandrel is 120°-160° C.

To improve the sliding properties of the heating mandrel on insertion into and extraction out of the pipe, the surface of the heating mandrel is hard-anodized to yield a smooth, hard surface.

Figure 2:
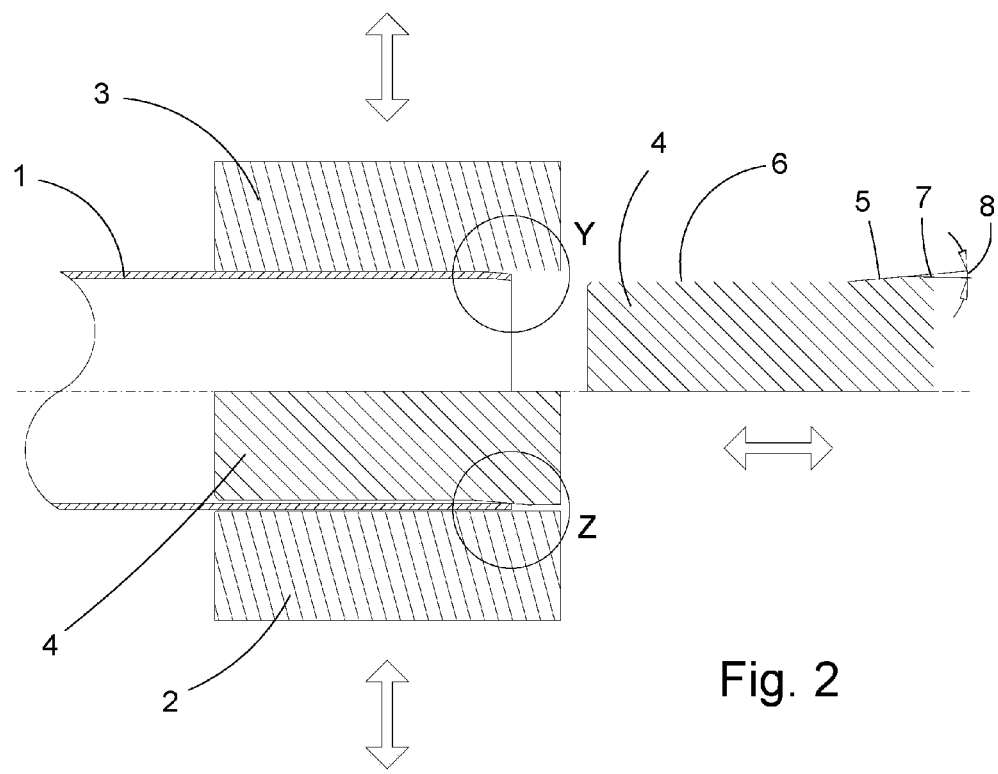
FIG. 2 shows a side sectional view through a plastic pipe with heating jaws on the exterior and with the heating mandrel in a first upper position exterior to the pipe and in a second lower position, showing the condition in which the heating mandrel is inserted into the pipe.

FIG. 2 shows the arrangement in a side view with a plastic pipe 1, heating jaws 2, 3 being arranged on the exterior thereof, so that they are in contact with the plastic pipe 1. The heating mandrel 4 is shown outside of the plastic pipe in the upper half of FIG. 2. The heating mandrel has a forward first length section 6 and a rear second length section 5. It can be seen that there is a wedge-shaped enlargement of the diameter on the second rear length section 5, such that the wedge angle 8 amounts to 2°-20°, preferably about 5°. The forward length section 6 is designed as a straight cylinder. The length sections 6 and 5 develop continuously into one another. Another third length section 7 is connected to the second length section and is again designed as a straight cylinder, so that the second length section 5 forms a continuous transitional region between the first and third length sections.

Figure 2A:
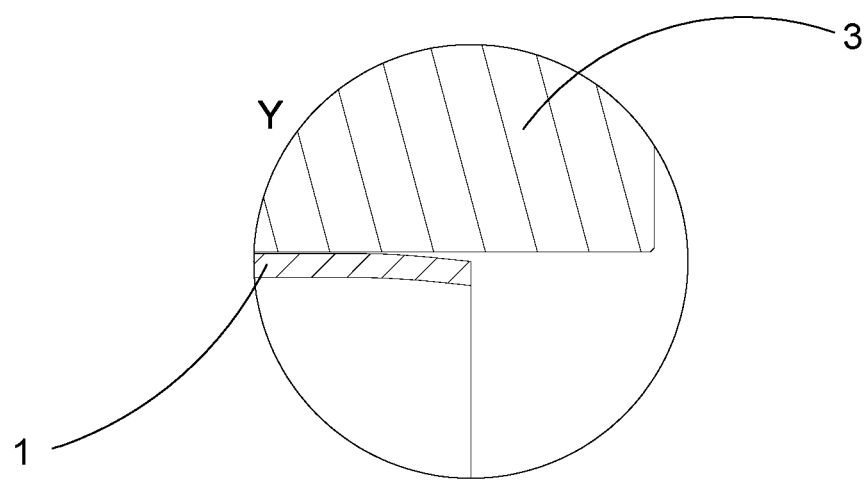
FIG. 2a shows the detail Y from FIG. 2 in an enlarged diagram, in which the shrinkage of the plastic pipe at the cut edge is discernible.
Figure 2B:
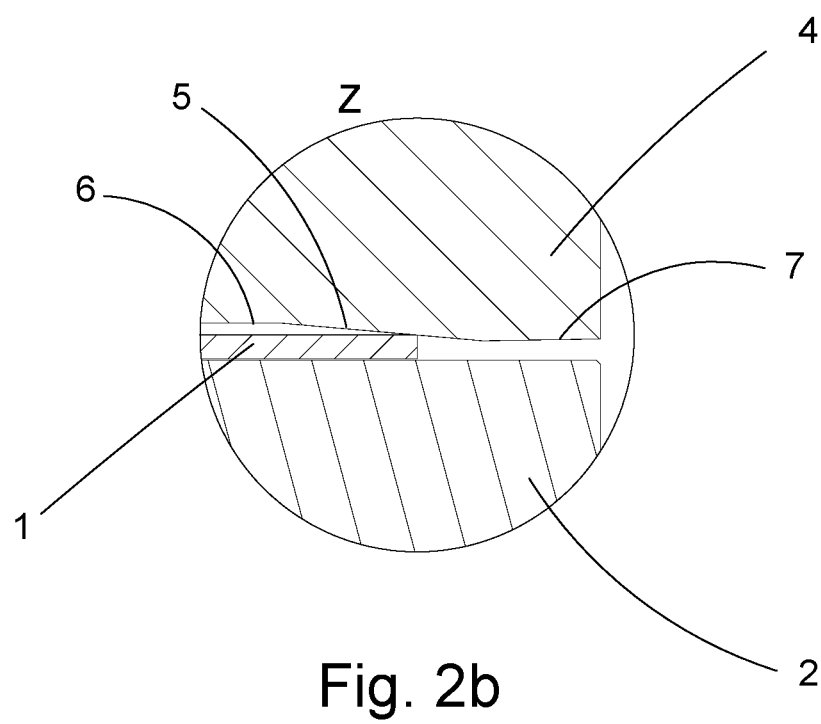
FIG. 2b shows the detail Z from FIG. 2, where it is clear that the wedge-shaped widening of the heating mandrel has resulted in contact with the interior of the plastic pipe.

FIG. 2b shows the detail Z from FIG. 2. This shows how the plastic pipe 1 is pressed outward over the wedge-shaped surface 5 at the cut edge and thus, in contrast with FIG. 2a, which shows the detail Y from FIG. 2, the plastic pipe is in contact with the external heating jaw 2. Because of the short distance over which the heating mandrel 4 causes a jamming of the pipe 7 between the heating mandrel 4 and the external heating jaw 2, the resulting clamping force can easily be overcome by adequate tensile and compressive forces on the heating mandrel 4.

The forward edge of the heating mandrel 4 on the forward edge of the length section 6 may be designed with a bevel to prevent problems on insertion of the heating mandrel into the pipe due to an excessive shrinkage of the pipe at the end.

Figure 1A:
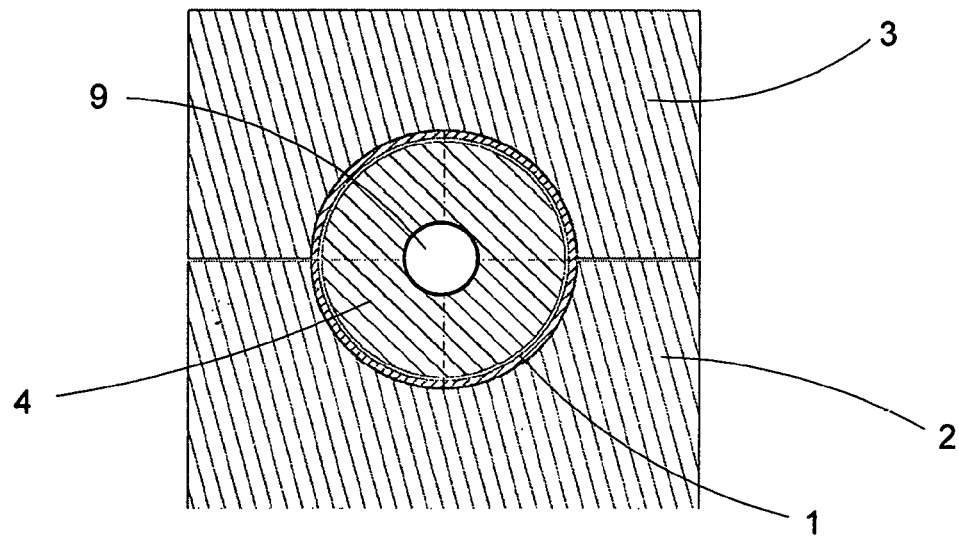
FIG. 1a is a sectional view similar to FIG. 1 but showing a central borehole in the heating mandrel to receive a central heating element.
Figure 1B:
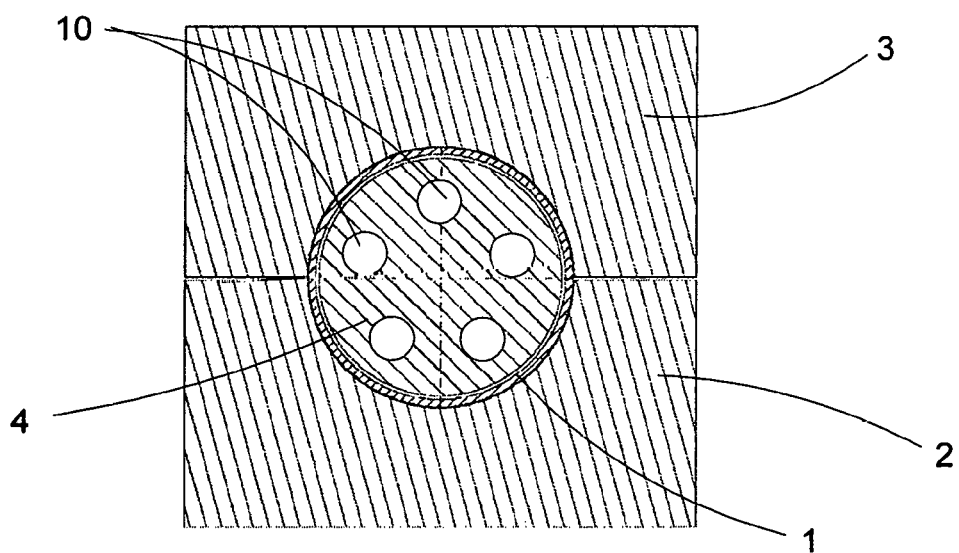
FIG. 1b is a sectional view similar to FIG. 1a but showing a series of boreholes in the heating mandrel, each to receive a heating element or rod.

FIGS. 1a and 1b illustrate that the heating mandrel 4 can have a central borehole 9 to receive a heating element (FIG. 1a), or can have a series of boreholes 10 arranged in a ring, each designed to receive a heating element or rod (FIG. 1b).

LIST OF REFERENCE NUMERALS 1 plastic pipe
2 heating jaw
3 heating jaw
4 heating mandrel
5 first length section
6 second length section
7 third length section
8 wedge angle
9 central borehole
10 boreholes

The invention claimed is:

1. A device for heating an end section of a plastic pipe (1) for preparing to form a sleeve on the plastic pipe, the device having at least two external heating jaws (2, 3) for reaching around and heating an exterior end section of the plastic pipe and having a heating mandrel (4) that can be inserted into the end section for heating the interior of the end section of the pipe, so that the end section can be heated to the deformation temperature of the plastic pipe or higher, characterized in that the heating mandrel (4) comprises a cylindrical metal body having a first diameter along a first forward length section (6) and having a second diameter on a second length section (5) on the rear end of the first forward length section, wherein the second diameter is larger than the first diameter and the second length section (5) is enlarged in a wedge shape starting from the first diameter, and including a third length section (7), whose diameter corresponds to the end diameter of the second length section (5), the third length section being connected to the rear end of the heating mandrel (4) at the second length section (5).

2. A device for heating an end section of a plastic pipe (1) for preparing to form a sleeve on the plastic pipe, the device having at least two external heating jaws (2, 3) for reaching around and heating an exterior end section of the plastic pipe and having a heating mandrel (4) that can be inserted into the end section for heating the interior of the end section of the pipe, so that the end section can be heated to the deformation temperature of the plastic pipe or higher, characterized in that the heating mandrel (4) comprises a cylindrical metal body having a first diameter along a first forward length section (6) and having a second diameter on a second length section (5) on the rear end of the first forward length section, wherein the second diameter is larger than the first diameter and the second length section (5) is enlarged in a wedge shape starting from the first diameter, and wherein the change in diameter of the second length section runs at a wedge angle of 2°-20°, such that the difference in diameters between the first length section (6) and the end of the second length section (5) amounts to 0.5-2 mm.

3. The device according to claim 2, characterized in that the wedge angle amounts to 5°.

4. A device for heating an end section of a plastic pipe (1) for preparing to form a sleeve on the plastic pipe, the device having at least two external heating jaws (2, 3) for reaching around and heating an exterior end section of the plastic pipe and having a heating mandrel (4) that can be inserted into the end section for heating the interior of the end section of the pipe, so that the end section can be heated to the deformation temperature of the plastic pipe or higher, characterized in that the heating mandrel (4) comprises a cylindrical metal body having a first diameter along a first forward length section (6) and having a second diameter on a second length section (5) on the rear end of the first forward length section, wherein the second diameter is larger than the first diameter and the second length section (5) is enlarged in a wedge shape starting from the first diameter, and wherein the cylindrical metal body is designed in a ring shape and has a row of boreholes arranged in a ring on the circumference, each borehole to receive one heating rod.

* * * * *